United States Patent
Steele et al.

(10) Patent No.: US 12,551,655 B2
(45) Date of Patent: Feb. 17, 2026

(54) DETECTION AND PRESSURE RELIEF FOR PERCUTANEOUS CLOSURE OF A VESSEL

(71) Applicant: Boston Scientific Scimed, Inc., Maple Grove, MN (US)

(72) Inventors: Brad Steele, Sunnyvale, CA (US); Lucas Buchanan, Sunnyvale, CA (US); William Whealon, Sunnyvale, CA (US)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 767 days.

(21) Appl. No.: 17/899,279

(22) Filed: Aug. 30, 2022

(65) Prior Publication Data

US 2023/0067426 A1   Mar. 2, 2023

Related U.S. Application Data (60) Provisional application No. 63/239,163, filed on Aug. 31, 2021.

(51) Int. Cl.
*A61M 25/00*    (2006.01)

(52) U.S. Cl.
CPC .... *A61M 25/0075* (2013.01); *A61M 25/0012* (2013.01); *A61M 25/0054* (2013.01); *A61M 2025/0046* (2013.01); *A61M 2025/0078* (2013.01)

(58) Field of Classification Search
CPC .......... A61M 25/0075; A61M 25/0012; A61M 25/0054; A61M 2025/0046; A61M 2025/0078; A61M 25/10; A61M 39/0247; A61M 2205/15; A61M 2039/0258; A61M 25/1002; A61M 2025/1052; A61M 2202/0425; A61B 17/0057; A61B 2017/00672; A61B 2017/0061; A61B 2017/0065; A61B 2017/00659
USPC ..... 604/506–510, 93.01, 117, 158, 162, 163, 604/164.01, 164.08, 264, 265, 268
See application file for complete search history.

(56) References Cited

U.S. PATENT DOCUMENTS

| | | | | |
|---|---|---|---|---|
| 4,838,280 | A | * | 6/1989 | Haaga ................ A61B 10/0233 600/564 |
| 5,431,639 | A | * | 7/1995 | Shaw ................ A61B 17/0057 604/11 |
| 6,413,235 | B1 | | 7/2002 | Parodi |
| 6,423,032 | B2 | | 7/2002 | Parodi |

(Continued)

FOREIGN PATENT DOCUMENTS

| | | | | |
|---|---|---|---|---|
| WO | WO-2016161062 A1 | * | 10/2016 | ....... A61B 5/150519 |
| WO | WO-2021/087363 A1 | | 5/2021 | |
| WO | WO-2021/087480 A1 | | 5/2021 | |

OTHER PUBLICATIONS

Henry, et al. (1999). "Carotid Stenting With Cerebral Protection: First Clinical Experience Using the PercuSurge GuardWire System" *J. Endovasc. Surg.* 6:321-331.

*Primary Examiner* — Cris L. Rodriguez
(74) *Attorney, Agent, or Firm* — Seager, Tufte & Wickhem, LLP (57) ABSTRACT

A pressure relief device for use in a percutaneous procedure, the device comprising a tube having a distal opening into an internal lumen and a proximal opening from the internal lumen, a length of the tube sized to position the distal opening near a closed arteriotomy in a vessel and the proximal opening remains external to a patient's skin. Related devices, kits, and methods are provided.

28 Claims, 9 Drawing Sheets

(56) References Cited

U.S. PATENT DOCUMENTS

| | | | |
|---|---|---|---|
| 6,595,953 B1 | 7/2003 | Coppi et al. | |
| 6,837,881 B1 | 1/2005 | Barbut | |
| 7,083,594 B2 | 8/2006 | Coppi | |
| 7,488,340 B2* | 2/2009 | Kauphusman | A61B 17/0401 606/213 |
| 8,157,760 B2 | 4/2012 | Criado et al. | |
| 8,663,272 B2* | 3/2014 | Hastings | A61B 17/0057 606/213 |
| 9,241,699 B1 | 1/2016 | Kume et al. | |
| 9,265,512 B2 | 2/2016 | Garrison et al. | |
| 2001/0044598 A1 | 11/2001 | Parodi | |
| 2004/0054346 A1* | 3/2004 | Zhu | A61B 17/0057 348/E7.024 |
| 2005/0154344 A1 | 7/2005 | Chang | |
| 2005/0154349 A1 | 7/2005 | Renz et al. | |
| 2006/0106338 A1 | 5/2006 | Chang | |
| 2008/0038313 A1* | 2/2008 | Addis | A61P 17/02 604/82 |
| 2008/0221614 A1* | 9/2008 | Mas | A61B 17/0057 606/213 |
| 2008/0287986 A1* | 11/2008 | Thor | A61B 17/0057 606/213 |
| 2009/0024072 A1 | 1/2009 | Criado et al. | |
| 2009/0044895 A1* | 2/2009 | Fortune | A61L 31/129 156/60 |
| 2009/0054926 A1* | 2/2009 | Pipenhagen | A61B 17/0057 606/213 |
| 2009/0171282 A1* | 7/2009 | Pipenhagen | A61M 25/04 604/264 |
| 2009/0198172 A1 | 8/2009 | Garrison et al. | |
| 2009/0254166 A1 | 10/2009 | Chou et al. | |
| 2010/0042118 A1 | 2/2010 | Garrison et al. | |
| 2010/0185216 A1 | 7/2010 | Garrison et al. | |
| 2010/0204684 A1 | 8/2010 | Garrison et al. | |
| 2010/0217276 A1 | 8/2010 | Garrison et al. | |
| 2010/0228269 A1 | 9/2010 | Garrison et al. | |
| 2011/0004147 A1 | 1/2011 | Renati et al. | |
| 2011/0034986 A1 | 2/2011 | Chou et al. | |
| 2011/0213459 A1 | 9/2011 | Garrison et al. | |
| 2012/0089171 A1* | 4/2012 | Hastings | A61B 17/0057 606/192 |
| 2013/0197621 A1 | 8/2013 | Ryan et al. | |
| 2014/0046346 A1 | 2/2014 | Hentges et al. | |
| 2014/0135661 A1 | 5/2014 | Garrison et al. | |
| 2014/0296769 A1 | 10/2014 | Hyde et al. | |
| 2014/0296868 A1 | 10/2014 | Garrison et al. | |
| 2015/0080942 A1 | 3/2015 | Garrison et al. | |
| 2015/0174368 A1 | 6/2015 | Garrison et al. | |
| 2015/0327843 A1 | 11/2015 | Garrison | |
| 2016/0242764 A1 | 8/2016 | Garrison et al. | |
| 2016/0296690 A1 | 10/2016 | Kume et al. | |
| 2016/0317288 A1 | 11/2016 | Rogers et al. | |
| 2017/0296798 A1 | 10/2017 | Kume et al. | |
| 2018/0235789 A1 | 8/2018 | Wallace et al. | |
| 2019/0125512 A1 | 5/2019 | MacDonald et al. | |
| 2019/0183468 A1* | 6/2019 | Sykes | A61B 17/12159 |
| 2020/0397472 A1 | 12/2020 | MacDonald et al. | |
| 2021/0145453 A1 | 5/2021 | Kume | |
| 2022/0047267 A1 | 2/2022 | Johnston et al. | |
| 2022/0193321 A1 | 6/2022 | Kume et al. | |

* cited by examiner

DETECTION AND PRESSURE RELIEF FOR PERCUTANEOUS CLOSURE OF A VESSEL

CROSS-REFERENCE TO RELATED APPLICATIONS

The present application claims the benefit of priority under 35 U.S.C. § 119(e) to U.S. Provisional Patent Application Ser. No. 63/239,163, filed Aug. 31, 2021. The disclosure of the provisional application is hereby incorporated by reference in its entirety.

FIELD

The present technology relates generally to medical devices and methods, and more particularly, to the detection and pressure relief for percutaneous closure of a vessel.

BACKGROUND

Certain vascular interventions involve the insertion of a procedural sheath through a puncture (arteriotomy) in an artery. An internal lumen of the procedural sheath provides a passageway for the insertion of an interventional device into the artery and to an area of treatment. In a typical procedure, the procedural sheath is inserted into the artery and an intervention is performed using the interventional device, which is inserted into the artery via the procedural sheath. At the end of the procedure, the procedural sheath is removed from the artery and closure of the opening in the vessel wall performed.

It is important to achieve hemostasis upon removal of the procedural sheath in order to avoid a loss of blood, pain or nerve damage due to creation of a hematoma. In certain clinical procedures, for example procedures requiring access to the carotid arteries, the consequences of failure to achieve complete hemostasis can be extreme. For such transcarotid procedures, if full hemostasis is not achieved, the resultant hematoma may lead to loss of airway passage and/or critical loss of blood to the brain, both of which lead to severe patient compromise and possibly death. Alternately, a vessel injury or dissection may require adjunct repair and lead to prolonged procedure time and risk of complication.

Percutaneous closure techniques currently in use include manual compression and/or vascular closure devices. Examples of vascular closure devices include suture-based closure devices such as the Abbott Vascular PERCLOSE Proglide or ProStar family of devices. Other closure devices include clip closure devices such as the Abbott Vascular STARCLOSE device, or "plug" closure devices such as the Kensey Nash/St. Jude Medical ANGIOSEAL device.

The current technology, regardless the closure technique used, is blind in the sense there is no visual confirmation that closure has been successful. Fluoroscopy is no longer practical as the sheath has already been removed and contrast cannot easily be injected to determine whether a leak is occurring. Ultrasound is sometimes used to monitor closure.

SUMMARY

In an aspect, described is a pressure relief device for use in a percutaneous procedure including a tube having a distal opening into an internal lumen and a proximal opening from the internal lumen. A length of the tube is sized to position the distal opening near a closed arteriotomy in a vessel and the proximal opening remains external to a patient's skin.

The device can further include a visual indicator coupled to a proximal end region of the tube. The visual indicator can be fixedly coupled to the proximal end region of the tube or removably coupled to the proximal end region of the tube. The visual indicator can be a thin disc of material configured to change color upon contact with blood from the internal lumen. The material can be high-density polyethylene, polyamide, polyethersulfone, or polyvinylidene fluoride. The visual indicator can have a larger outer diameter than an outer diameter of the proximal end region of the tube.

The tube can be formed of a polymer, metal, or a combination of polymer and metal. At least a portion of the tube can be coated on an external surface with a lubricious polymer coating. The polymer coating can be silicone or polytetrafluoroethylene. The tube can have a length that is between 3 cm and 10 cm. The tube can be circular or oval in cross-section. The distal opening can be the only opening of a distal end region of the tube. The tube can include one or more side wall openings through a distal end region of the tube. The proximal opening can be the only opening of a proximal end region of the tube. The tube can include one or more side wall openings through a proximal end region of the tube.

The tube can have an inner diameter of about 0.004" and 0.020". The lumen of the tube can include a viscous material configured to impede the ingress of foreign material or air into the tissue track. The viscous material can be petrolatum, polyethylene glycol, or glycerin containing one or more antibiotics. The viscous material can fill the lumen from the proximal opening to the distal opening. The viscous material can be a discrete plug of material contained within the lumen. Blood is able to pass through the viscous material to provide pressure relief.

The vessel can be a carotid artery including a common carotid artery, an internal carotid artery, and an external carotid artery. In use, the proximal opening can be positioned external to the patient's skin forming a pressure gradient with the region near the closed arteriotomy.

The device can be part of a kit including one or more visual indicators configured to mate with a proximal end region of the tube. A length of the tube can be customizable by trimming. The kit can further include an inserter having an outer diameter sized to receive the lumen of the tube and a length sufficient to insert through the lumen so that a distal end region projects beyond the distal opening of the tube. The kit can further include one or more of a procedural introducer sheath, a sheath dilator, an introducer guide wire, a closure device delivery sheath, a vessel closure device applier, and a closure device.

In an interrelated implementation, described in a method of using a pressure relief device following a percutaneous procedure including closing an arteriotomy in a vessel percutaneously; inserting a pressure relief device through a tissue track leading toward the arteriotomy, the pressure relief device having a tube having a distal opening into an internal lumen and a proximal opening from the internal lumen; and positioning the distal opening near the arteriotomy and the proximal opening external to a patient's skin. The method can further include coupling a visual indicator to a proximal end region of the tube that is configured to change color upon contact with blood from the internal lumen. The visual indicator can be fixedly coupled or removably coupled. The vessel can be a carotid artery including a common carotid artery, an internal carotid artery, and an external carotid artery.

In some variations, one or more of the following can optionally be included in any feasible combination in the above methods, apparatus, devices, and systems. More details of the methods, apparatus, devices, and systems are set forth in the accompanying drawings and the description below. Other features and advantages will be apparent from the description and drawings.

BRIEF DESCRIPTION OF THE DRAWINGS

These and other aspects will now be described in detail with references to the following drawings. Generally speaking the figures are exemplary and are not to scale in absolute terms or comparatively but are intended to be illustrative. Relative placement of features and elements is modified for the purpose of illustrative clarity.

It should be appreciated that the drawings are for example only and are not meant to be to scale. It is to be understood that devices described herein may include features not necessarily depicted in each figure.

DETAILED DESCRIPTION

Disclosed is a pressure relief device configured for use in a vessel access site such as an incision, puncture, penetration or other passage through the vessel, in particular a carotid artery. It may be used to relieve pressure at the vessel access site and in some implementations, aid in identifying the state of closure of the vessel access site.

Figure 1:
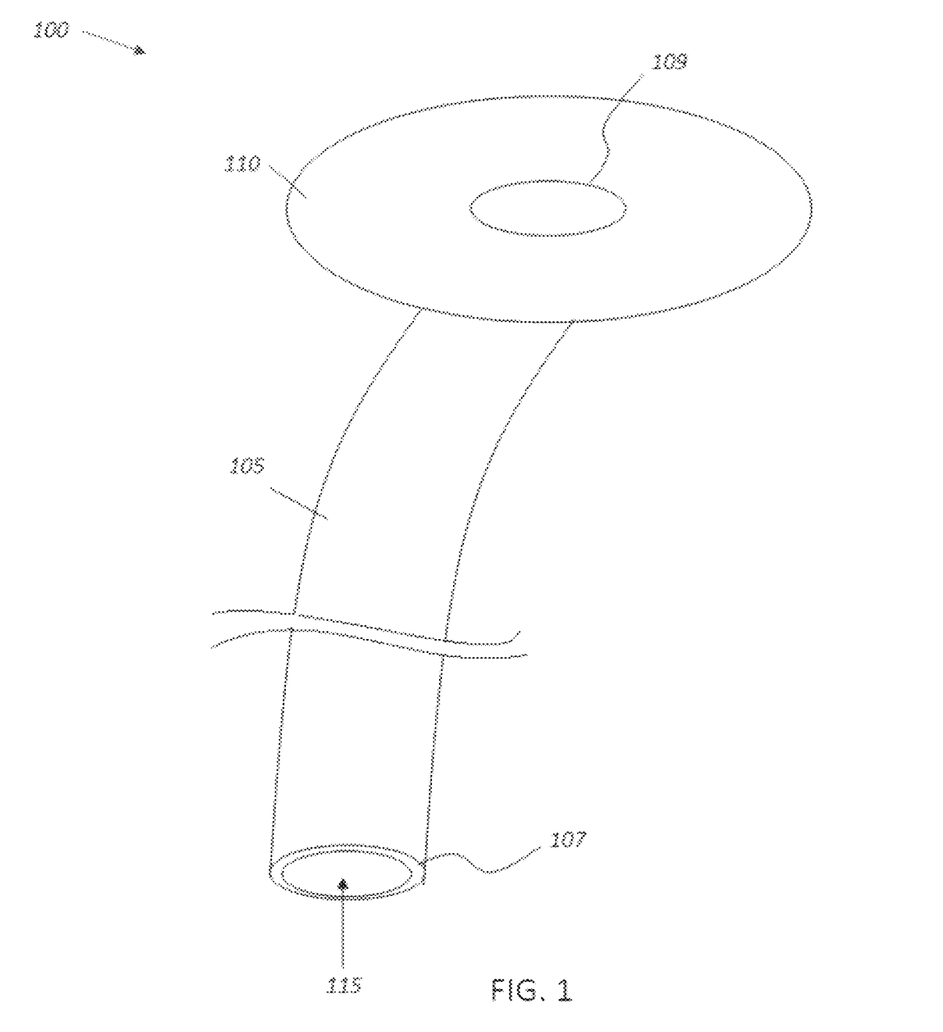
FIG. 1 is a perspective view of a pressure relief device configured to additionally detect a state of vessel closure.

FIG. 1 shows an implementation of a pressure relief device 100 configured to relieve pressure and detect a state of vessel closure. The device 100 can be used in a transcarotid procedure performed at least partially on a blood vessel located in the neck of a patient, such as the carotid arteries including the common carotid artery. The device 100 is designed to be implanted temporarily and short-term so that a physician can remove the device 100 once no further risk of failed closure exists. Typically, the highest risk for failed closure is immediately following closure and at the time of first ambulation following a procedure or within about 12-24 hours after the procedure. Thus, the device 100 can be removed preferably after about 12-24 hours following closure and/or while the patient is being monitored at the hospital. The device 100 can remain in place for longer than 24 hours as well, such as up to about 48, 60, 72, 84, or about 96 hours.

The device 100 includes a thin-walled tube 105 that may optionally be coupled at a proximal end to an indicator 110, each of which will be described in more detail below. The tube 105 can be formed of any of a variety of materials including polymers, metals, or a combination of polymers including silicone, polyethylene, polyamide, polyester, PEBAX, and metals and metal alloys including stainless steel and Nitinol. Metal braid/coil reinforced polymeric tubes are considered herein as well. The tube 105 may be made of a silicone elastomer or non-biodegradable polymer that is biocompatible, soft, and relatively flexible. The soft, flexible tube 105 is preferably resistant to kinking. The material of the tube 105 is selected to avoid irritating wounds, inhibiting wound healing, or causing discomfort to a patient. In some implementations, the tube 105 can be polytetrafluoroethylene (PTFE) or made of another material and coated with PTFE in such a way to minimize clotting and ensure any blood present at the wound site flows towards the proximal end of the tube 105. The tube 105 can be flexible or substantially stiff. In some implementations, a portion of the tube 105 is flexible and another portion is less flexible or substantially stiff. The external surface of the tube 105 is preferably smooth to permit sealing between the surface tissue and the exterior of the tube 105. Sealing prevents air from passing between the tube 105 and the skin to reduce the risk of infection. The external surfaces of the device 100, particularly the tube 105, can be lubricious or coated with a lubricious coating such as silicone or another hydrophilic coating along at least a portion of the tube 105. The cross-sectional shape of the tube 105 can be circular, oval, or other non-circular shape. The shape and/or size of the tube 105 can vary along its length.

The tube 105 can have a single distal opening from the lumen 115 at its distal-most end 107 and a single proximal opening from the lumen 115 at its proximal-most end 109 (see FIG. 1). The distal opening can be the only opening of the distal end region of the tube and the proximal opening can be the only opening of the proximal end region of the tube 105. The tube 105 can have additional openings along its length. For example, the proximal end region of the tube 105 can have one or more openings through a side wall near, for example, the location of the indicator 110. The distal end region of the tube 105 can also incorporate one or more openings through a side wall. The multiple openings can allow for blood to enter the lumen 115 even if another opening such as the distal opening at the distal-most end 107 becomes blocked.

The lumen 115 of the tube 105 can be sized and finished to remain patient to allow a small amount of blood to enter and pass from the distal-most end 107 of the tube 105 to the proximal-most end 109 of the tube 105. The inner diameter of the tube 105 can be between about 0.004" (0.102 mm) and 0.020" (0.508 mm). In some implementations, the inner diameter of the tube 105 can be sized to be slideably received over a 20G inserter (nominal OD of about 0.908 mm) for implantation, which will be described in more detail below. The inserter can aid in deployment of the tube 105 to prevent crushing or kinking. The tube 105 itself can be designed to be resistant to crushing or kinking, however, the inserter can provide additional stiffness during deployment.

In some implementations, the lumen 115 can include a material such as a viscous material that is configured to impede the ingress of foreign material, air, etc. into the tissue track. The viscous material can be a gel or liquid, preferably one having anti-microbial properties. The viscous material can include petrolatum, polyethylene glycol, glycerin, and other biocompatible materials incorporating one or more antibiotics such as neomycin, polymyxin B, bacitracin, and other topical ointments containing cyclic peptides. The material can fill the lumen 115 of the tube 105 from distal opening to proximal opening or the material can be positioned within the lumen 115 as a discrete plug of material. Whether completely filling the lumen 115 or as a discrete plug of material, the material is selected so that blood is able to pass through the material so the tube 105 provides pressure relief in the instance of a hematoma.

Again with respect to FIG. 1, the device 100 can optionally include a proximal visual indicator 110 coupled to a proximal end region of the tube 105. The indicator 110 is located near the proximal opening(s) so that blood that enters the lumen 115 near the distal end region can come into contact with the indicator 110 on the proximal end region. The indicator 110 can be a thin disc of material configured to undergo a color change upon contact with blood. The material of the indicator can include materials such as a filter material, woven textile, paper, or other material. The material of the indicator 110 is preferably white so that contact with blood is readily visible and makes detection of the blood flow much easier, even from a distance. The indicator 110 can be made of high-density polyethylene (HDPE) (TYVEK), polyamide, polyethersulfone (PES), polyvinylidene fluoride (PVDF), and the like. The indicator 110 can have an outer diameter that is larger than an outer diameter of the proximal end of the tube 105. The outer diameter can be approximately 1 inch (2.54 cm), or between about 0.5" (1.27 cm) and 2.0" (5.08 cm). The thickness of the indicator 110 can vary as well and can be about 0.004" (0.102 mm) to 0.020" (0.508 mm) in thickness. In some implementations, the indicator 110 can aid in fixation of the proximal end of the tube 105 to the patient's skin. For example, a lower side of the indicator 110 can be coated with an adhesive so as to be adhered to the patient's skin. The device 100 can also be secured to a patient using tape or other materials to avoid the device from being inadvertently snagged or pulled out of place or becoming kinked in a way that would impact its function.

Figure 2A:
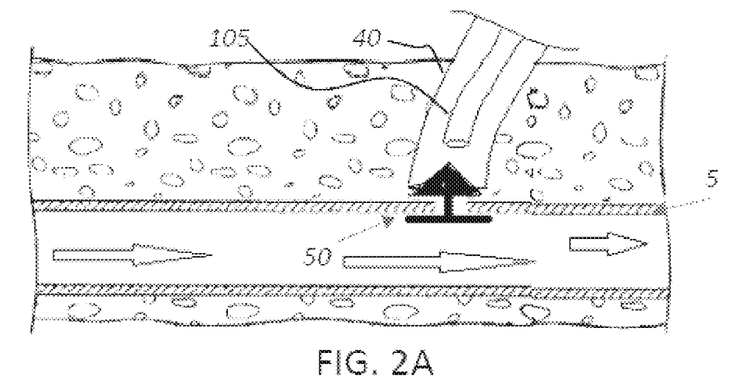
FIG. 2A shows an implementation of a pressure relief device inserted through a vessel closure device delivery sheath.
Figure 2B:
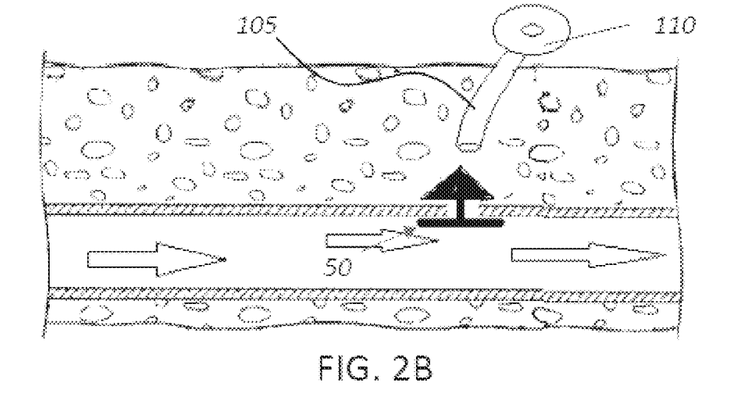
FIGS. 2B-2F illustrate the pressure relief device positioned near a closure device for receiving blood from the access site towards a proximal indicator of the device configured to present a visual indication of the presence of blood near the closure device.
Figure 2C:
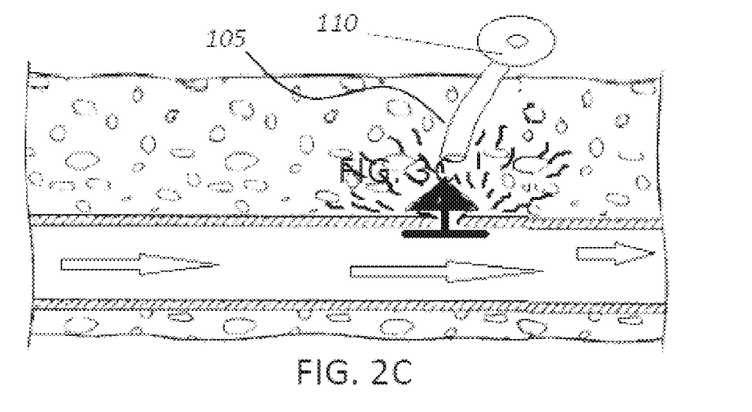
Figure 2D:
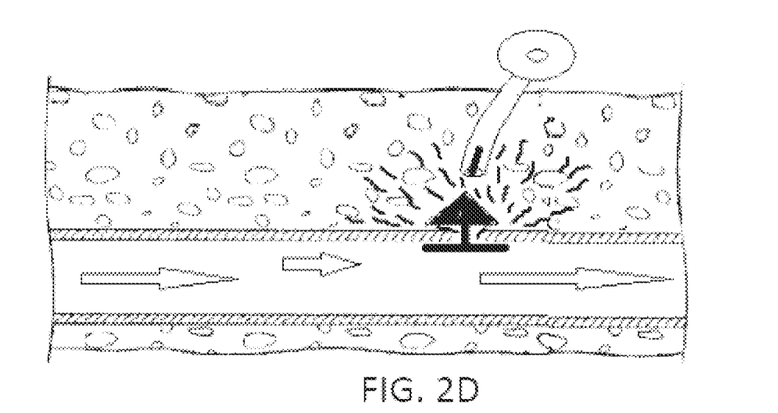
Figure 2E:
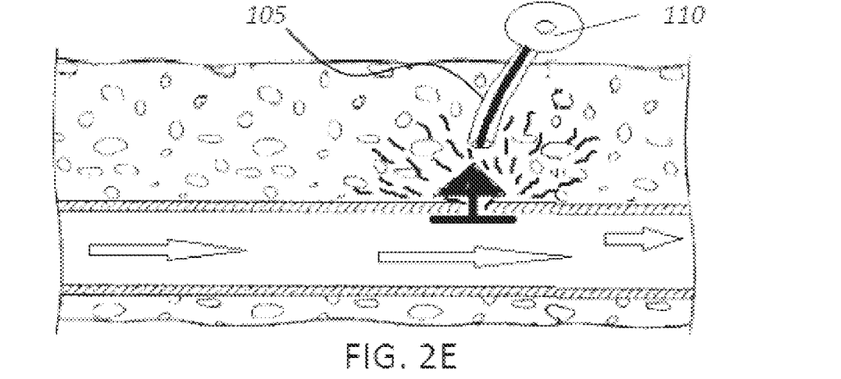
Figure 2F:
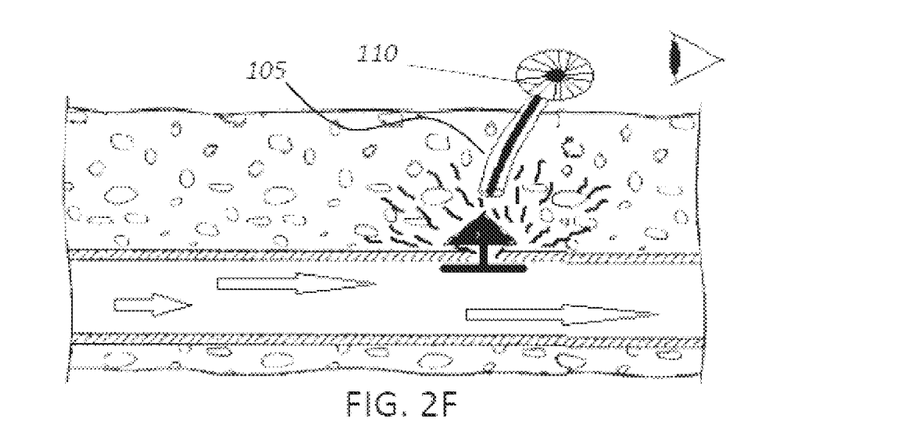

The device 100 is positioned in a patient so that the distal end is positioned adjacent a closed arteriotomy and the indicator 110, if present, or the proximal end of the tube 105 remains external to the skin. The pressure relief device 100 can be inserted through a vessel closure device delivery sheath 40 (see FIG. 2A) or using a dedicated insertion tool 60 (see FIGS. 3A-3C). In either method, the distal end of the tube 105 can be positioned in the tissue space immediately adjacent the closed arteriotomy and the proximal end of the tube 105 can remain outside the patient's skin. The proximal end of the tube 105, particularly the proximal opening from the lumen 115, can be exposed to the atmosphere such that a pressure gradient is formed and any blood trapped near the closed arteriotomy can be drained to outside the skin. If the arteriotomy failed to close and leaking is occurring (see FIG. 2C), the blood can enter the lumen 115 of the tube 105 near the distal end region of the tube 105 and be drawn up toward the proximal end of the tube 105 (FIGS. 2D-2F). The inner diameter of the tube 105, the presence of a viscous material in the lumen 115, and the viscosity of the material in the lumen 115 can dictate the pressure differential to ensure blood from the arteriotomy or hematoma egresses to the proximal-most end 109 of the tube 105. In some implementations, the proximal end of the tube 105 is coupled to a proximal indicator 110 positioned external to the patient's skin. The blood can make contact with the proximal indicator 110 and present a visual indication of the presence of the blood (FIG. 2F).

The device 100 can present visually the presence of blood once more than a selected amount of blood has passed through the tube 105. The selected amount can be as little as about 0.5 mL to about 1 mL of blood passing through the tube 105 before the indicator 110 visually presents the presence of the blood. Most closure procedures will necessarily result in some amount of blood being released and present in the environment of the closure device. The device 100 described herein is intended to identify the presence of blood near the arteriotomy that is out of the ordinary and beyond the residual amount of blood that might be present following a closure procedure. The position of the indicator relative to the lumen 115 can be controlled to achieve a particular level of visual detection provided by the indicator 110. The greater distance the indicator 110 is positioned relative to the outlet from the lumen 115, the greater the amount of blood would be needed for the blood to come into contact with the indicator 110. Thus, the distance between the indicator 110 and the outlet from the lumen 115 can be selected so that a selected amount of blood (e.g., about 1 mL of blood) causes a visual display on the indicator 110, but less than about this selected amount would not significantly result in a color change.

The indicator 110 can be annular shaped having an inner diameter sized to be received by an outer diameter of the tube 105 at the proximal end region. The indicator 110 can be recessed relative to the proximal opening from the lumen 115 so that at least a portion of the proximal end region of the tube 105 projects above (i.e., proximal to) a proximal-facing surface of the indicator 110. This separation between the proximal-facing surface of the indicator 110 and the proximal opening from the lumen 115 helps to control whether or not the amount of blood exiting the lumen 115 at the proximal opening comes into contact with the indicator 110. In another example, the indicator 110 can be a strip of material that does not encircle the proximal end region of the tube 105. The strip of material can be an elongate rectangular or oval shape that is attached to the tube 105 at a first end near the proximal opening. The first end can be in contact with at least a portion of the proximal opening or can be separated a distance from the proximal opening. Blood exiting the proximal opening can come into contact with the first end of the indicator 110 upon release of a selected amount of blood from the proximal opening, for example about 0.5 ml to about 1 mL of blood. The blood can be drawn along a surface of the indicator 110 away from the first end towards a second end of the indicator providing a visual indication of the presence of the blood exiting the tube 105. The indicator 110 can have any of a variety of shapes and attach according to any of a variety of configurations relative to the proximal opening from the tube 105.

The indicator 110 can be fixedly coupled to the proximal end region of the tube 105 or removably coupled to the proximal end region of the tube 105. This allows for a soiled indicator 110 to be removed from the tube 105 and a new indicator 110 coupled to the proximal end region of the tube 105 in its place. For example, if the indicator 110 has come into contact with blood and the user would like to continue monitoring the patient for any further blood being drawn through the tube 105 while the tube 105 remains in place near the closure site. Additionally or alternatively, the entire device 100 can be replaced and a new device 100 inserted to continue monitoring the patient.

Figure 3A:
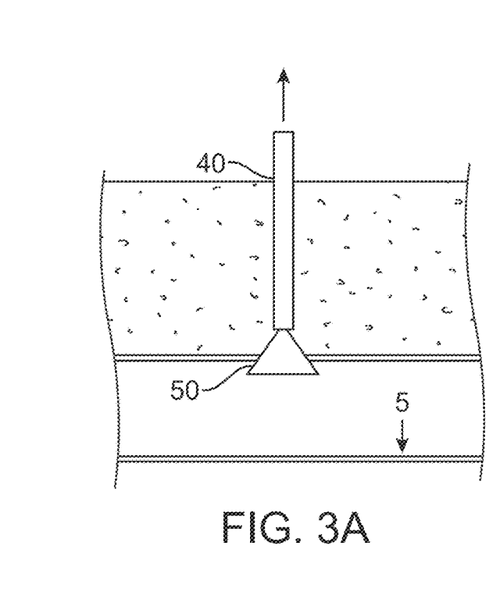
FIGS. 3A-3C illustrate an implementation of a pressure relief device inserted using a dedicated device.
Figure 3B:
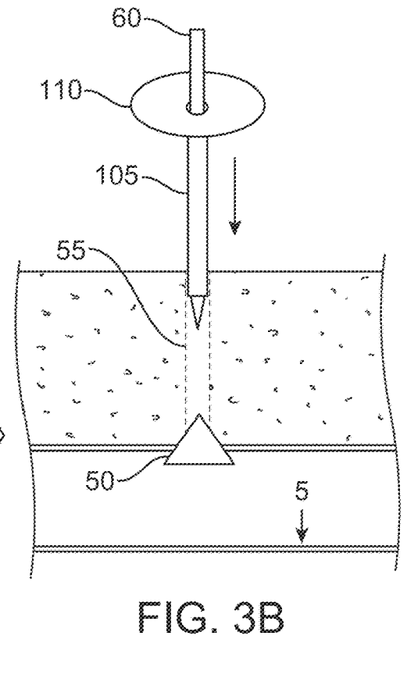
Figure 3C:
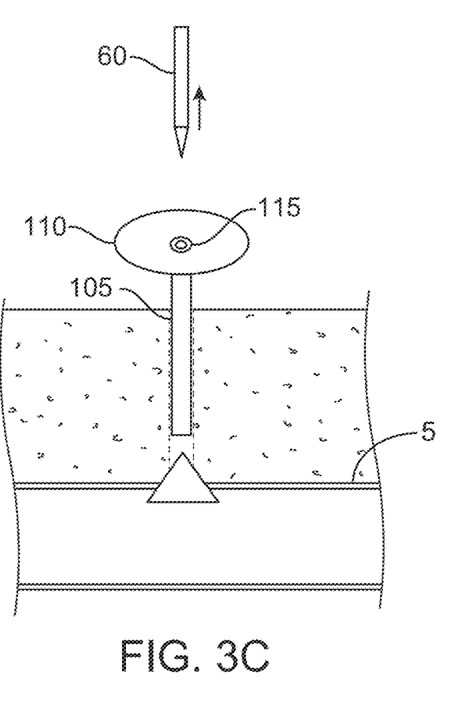

FIGS. 3A-3C illustrate an implantation method where the closure device delivery sheath 40 used to deploy the closure device 50 at the arteriotomy in the vessel 5 is withdrawn and a dedicated insertion tool 60 used to deploy the device 100 to the tissue space immediately adjacent the closure device 50. Withdrawal of the sheath 40 leaves a tissue track 55 to the closure device 50 (see FIG. 3B). The insertion tool 60 can be a dilator, trocar needle, or other inserter, and can be used to deliver the device 100 through the tissue track 55. In some implementations, the insertion tool 60 can be a sheath dilator 20 as described elsewhere herein having an outer diameter sized to receive the lumen 115 of the device 100 over it. Unlike the sheath dilator 20, the insertion tool 60 need not incorporate a guide wire lumen and can be a solid polymeric tool.

The insertion tool 60 can be pushable or have a stiffness along at least a portion of its length to allow for insertion of the device 100 through the existing tissue track 55 to a desired location (e.g., a space adjacent the closure device 50). However, the insertion tool 60 is sufficiently flexible, particularly at a distal end region, to smoothly navigate through the tissue track 55 without forming a new tissue track, e.g., by cutting through the adjacent subcutaneous tissue. At least a portion of the insertion tool 60 can be stiffer than the tube 105 of the pressure relief device 100 so that the tube 105 takes on a shape of the insertion tool 60. Alternatively, the insertion tool 60 can be more flexible than the tube 105 being delivered so that the insertion tool 60 take on the shape of the tube 105. In this implementation, the tube 105 can provide the pushability through the tissue track 55. Generally, the insertion tool 60 is flexible enough to follow the path of the pre-formed tissue track 55 directly to the closure device 50 without veering in one direction or another creating a new tissue track.

The insertion tool 60 preferably incorporates an atraumatic distal end designed to extend beyond the distal-most end 107 of the tube 105. The distal end can taper along a length from a first outer diameter sized to substantially match an inner diameter of the tube 105 to a smaller outer diameter at the distal-most end of the tool 60. The length of the taper can vary from about 0.5 cm up to about 1.5 cm. In other implementations, the atraumatic distal end of the insertion tool 60 can be rounded or bullet-shaped or have no taper. Preferably, the atraumatic distal end of the insertion tool 60 is designed to navigate through the pre-formed tissue track 55 without creating a new one and also without impacting the integrity of the closure device 50 deployed within the arteriotomy. The tapered distal end of the insertion tool 60 can ensure a smooth transition between the insertion tool 60 and the distal end of the tube 105 for a smooth insertion through the tissue track 55 without snagging on a square edge of the distal-most end 107 of the tube 105. The flexibility of the distal end of the insertion tool 60 can give way if it inadvertently comes into contact with the closure device 50.

Insertion of the device 100 can be performed under ultrasound to ensure the distal end of the tube 105 is navigated to the appropriate location adjacent the closure device 50. Once the tube 105 is navigated to a desired location near the closure device 50, the insertion tool 60 is withdrawn from the lumen 115 of the device 100 leaving the tube 105 in place within the tissue track 55. The distal opening into the lumen 115 can be placed sufficiently near the closure device 50 within the access site to draw in any blood that is released (see FIG. 3C). If a hematoma forms at the arteriotomy, a pressure gradient can drive blood into the distal opening (or other openings present near the distal end region of the tube 105), through the lumen 115 of the device 100, and towards the proximal-most end 109 of the tube 105. The proximal-most end 109 of the tube 105 is preferably located outside the skin of the patient. The indicator 110 can be attached to the proximal end region of the tube 105 so that blood traveling through the lumen 115 and out the proximal opening of the tube 105 can make contact with the indicator 110. FIGS. 3B and 3C show the indicator 110 is coupled to the proximal end region of the tube 105 at the time of insertion. The indicator 110 can be attached to the proximal end region of the tube 105 after implantation of the tube 105 in the tissue track 55.

The insertion trajectory of the tissue track 55 is shown in FIG. 3A along an axis that is substantially along the insertion/deployment axis of the closure device 50 positioned within the wall of the artery 5. In some implementations, the tissue track 55 is substantially straight and located directly over or substantially perpendicular to the access site. This configuration minimizes the overall length needed for the device 100 to extend from the closure device 50 to outside the patient's skin. The insertion trajectory and location can vary from this perpendicular arrangement although the length of the tube 105 may be increased to accommodate another angle besides perpendicular. In some implementations, the length between the distal-most end 107 of the tube 105 and the proximal-most end 109 of the tube 105 can be about 3 cm up to about 10 cm. In other implementations, the length between the distal-most and proximal-most ends 107, 109 of the tube 105 can be greater than a length of the tissue track 55 it is to be delivered through. This ensures the proximal-most end 109 of the tube 105 is exposed to the atmosphere and can be secured to a patient's skin in a comfortable manner and in a manner that avoids cutting off the lumen 115 of the tube 105 and prevents draining of the blood. The tube 105 can be formed of a polymer material that can be easily customized for length at the time of use, such as by trimming a section of the distal end region of the tube with scissors. The exterior of the tube 105 can incorporate one or more marks to delineate a length of the tube to provide guidance for customizing a tube length to the tissue track length prior to or after deployment.

The pressure relief device 100 can be packaged as a kit that additionally includes one or more of an insertion tool 60, a procedural introducer sheath 10, a sheath dilator 20, an introducer guide wire 30, a closure device delivery sheath 40, a vessel closure device applier, and a closure device 50. The kit can additionally include one or more additional indicators 110 configured to couple to the pressure relief device 100.

Figure 4A:
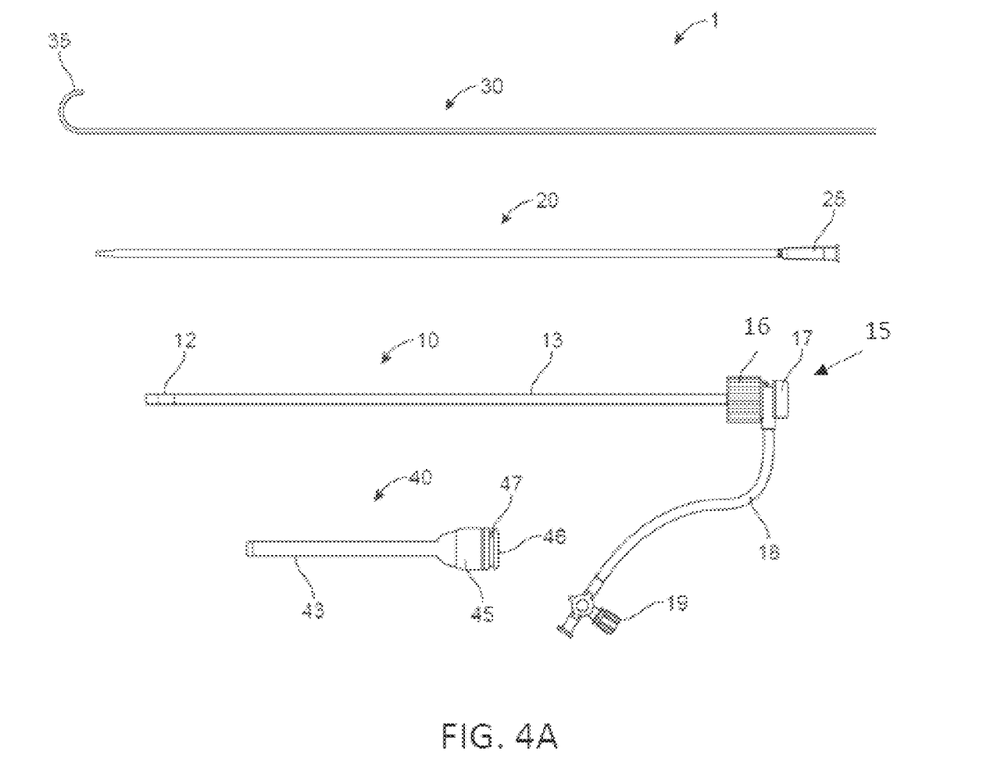
FIGS. 4A and 4B are exploded and assembled views, respectively, of an implementation of a vessel access and closure assist system.
Figure 4B:
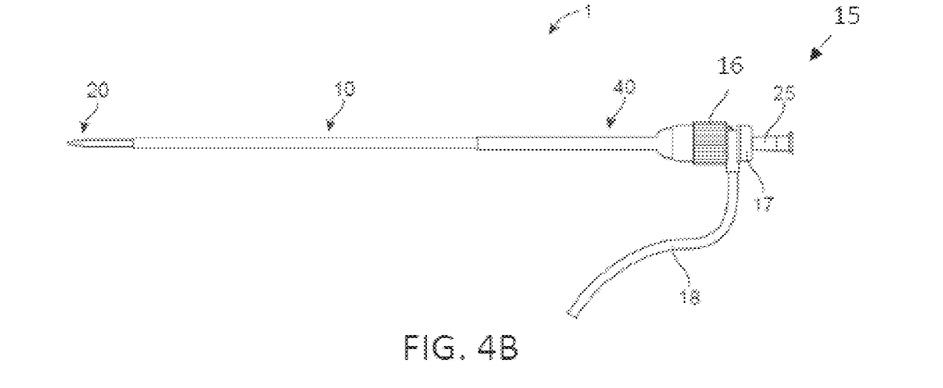

FIGS. 4A and 4B shows an implementation of a vessel access and closure assist system 1 configured to be used with the pressure relief device 100. It should be appreciated that any of a variety of access and closure systems can be used with the device 100 described herein and this is being described for illustrative purposes. FIG. 4A shows the system components apart from one another, and FIG. 4B shows the components assembled together prior to use. The system 1 can include at least a pair of sheaths including a procedural introducer sheath 10 and a vessel closure delivery sheath 40. The two sheaths can be coupled to one another to form a coupled sheath assembly that can be attached and detached as described further below. The system 1 may also include a sheath dilator 20 that is configured to fit inside the procedural sheath 10. The sheath dilator can include a dilator body and a proximal hub 25 and can be configured to receive an introducer guidewire 30. The dilator body can include a tapered distal tip. The system may also include the introducer guide wire 30. The procedural sheath 10, dilator 20, and vessel closure device delivery sheath 40 are configured to be introduced together as a system over the introducer guide wire 30 into the artery as described more fully below.

As shown in FIG. 4A, the procedural sheath 10 can include a sheath body 13 and a proximal hub 15 that forms a coupling mechanism. In an implementation, a distal radiopaque marker 12 can be positioned on the distal tip of the sheath body 13. A hemostasis valve 17 can be positioned on the proximal end of the proximal hub 15. The hemostasis valve 17 can be a passive seal style valve, or may be a Tuohy Borst style hemostasis valve. The hub also includes a side-arm 18 that terminates with a stopcock 19 and that defines an internal lumen that fluidly communicates with an internal lumen of the procedural sheath 10. Alternately, the proximal hub 15 of the procedural sheath 10 is a female Luer connection that is configured to attach a separate hemostasis valve component, such as a rotating hemostasis valve (RHV) or passive hemostasis valve.

The procedural sheath 10 is sized and shaped to be inserted into a blood vessel via an access site. In this regard, the procedural sheath 10 has an internal lumen that provides a passageway for inserting an interventional device into the blood vessel. As mentioned, the procedural sheath 10 may be adapted to be introduced through an incision or puncture in a wall of a common carotid artery, either an open surgical incision or a percutaneous puncture established, for example, using the Modified Seldinger technique or a micropuncture technique. The working length of the procedural sheath 10 can be in the range from 11 to 50 cm, usually being from 15 cm to 25 cm. The inner diameter may be in the range from 5 Fr (1 Fr=0.33 mm), to 7 Fr, usually being 6 Fr. The working length is the portion of the procedural sheath that is sized and shaped to be inserted into the artery and wherein at least a portion of the working length is actually inserted into the artery during a procedure.

For certain interventions, it may be desirable for the procedural sheath to have a more flexible distal section. In an implementation, the working length of the procedural sheath 10 is of a length configured to access the proximal internal carotid artery when inserted from an access location in the common carotid artery (CCA), for example 10-15 cm. In another implementation the device is has a working length configured to access the distal cervical internal carotid artery (ICA) when inserted from the CCA, for example 15-25 cm. In yet another implementation, the procedural sheath is of a working length configured to access the petrous, cavernous, or terminal portion of the ICA when inserted from the CCA, for example 20-35 cm. In this implementation, the distal-most portion (which may have a length of about 3 cm to about 6 cm) of the procedural sheath may be configured to be more flexible to accommodate the curvature in the petrous portion of the ICA. This additional flexibility may be achieved by using a lower durometer outer jacket material in this section. Alternately, the wall thickness of the jacket material may be reduced, and/or the density of the reinforcement layer may be varied to increase the flexibility. For example, the pitch of the coil or braid may be stretched out, or the cut pattern in the tubing may be varied to be more flexible. The distal most portion of the procedural sheath may also be tapered or stepped down to a smaller diameter. In an implementation, the procedural sheath may include multiple sections of flexibility, with increasing flexibility towards the distal end. U.S. Pat. Nos. 9,265,512 and 8,157,760 describe related systems and are both incorporated herein by reference in their entirety.

The procedural sheath 10 may also include a connection to a flow line or shunt that may be connected to a device for passive or active reverse flow. In an implementation, the flow line has an internal lumen that communicates with an internal lumen of the procedural sheath 10 for shunting blood from the procedural sheath. In an implementation, the flow line is a side arm or Y-arm that is attached to and extends from the procedural sheath 10 at a location between the distal and proximal ends of the procedural sheath 10.

The vessel closure device delivery sheath 40 can include an elongated body 43 and a proximal hub 45 that includes a hemostasis valve 47 and an end cap 46 on the proximal region of the elongated body 43. The proximal hub forms a coupling mechanism that couples to the coupling mechanism of the procedural sheath 10. The vessel closure device delivery sheath 40 has an internal lumen such that it can co-axially fit over the procedural sheath 10 and be shorter than the procedural sheath but still suitable for use in percutaneous procedures, for example in a range between 8 cm to 11 cm. As noted above, most vessel closure device systems are suitable for introducer sheaths 11 cm or shorter. In an implementation, the vessel closure device delivery sheath 40 has a working length of 8 cm to 11 cm and the procedural sheath has a minimum working length of 1 cm greater than the length of the vessel closure device delivery sheath 40, with a range of lengths as described above.

For a system 1 to be configurable for vessel closure devices that can be deployed through standard introducer sheaths, for example, the Mynx Vascular Closure Device (Access Closure), the vessel closure devices can be deployed through a vessel closure device delivery sheath 40 with a standard sheath hemostasis valve 47. In some instances, a vessel closure devices require custom delivery sheaths, for instance, the StarClose (Abbott Vascular) and Angioseal (St. Jude Medical) require delivery sheaths with features that couple with the closure device delivery system. Typically, the custom delivery sheaths are packaged with the closure delivery device and delivery system. At the end of the procedure, the procedural sheath is required to be exchanged for the custom delivery sheath to enable closure with the vessel closure system. For a system 1 to be configurable to these devices, the vessel closure device delivery sheath 40 requires corresponding features to enable deployment of these devices.

The internal lumen of the vessel closure device delivery sheath 40 is sized to receive the procedural sheath 10 such that the procedural sheath 10 can be coupled to the vessel closure device delivery sheath 40 by being positioned co-axially inside the vessel closure device delivery sheath 40. In this regard, the procedural sheath 10 is longer than the closure device delivery sheath 40 such that procedural sheath 10 extends out of the distal end of the vessel closure device delivery sheath 40 when the two are coupled as shown in FIG. 4B. The distal tip of the vessel closure device delivery sheath 40 sheath is sized and shaped to create a tight fit and smooth transition between the outer diameter of the procedural sheath 10 and the inner diameter of the vessel closure device delivery sheath 40, such that the insertion of the assembled sheaths is relatively smooth and easy. In this regard, the distal tip of the vessel closure device delivery sheath 40 may be tapered to form a gradual transition between the outer surfaces of the two sheaths.

In an implementation, system 1 includes features that couple the vessel closure device delivery sheath 40 and the procedural sheath 10 mechanically together, such that when assembled together the sheaths may be inserted as one, single device into the artery at the start of the procedure such that vessel closure device delivery sheath 40 and the procedural sheath 10 are fixed relative to one another. In one example, the procedure sheath has a rotatable collar 16 on the end of its proximal hub 15 with internal elements such as protrusions or threads that can rotationally engage and lock into grooves on the end cap 46 of the vessel closure device delivery sheath.

To assemble the two devices, the procedure sheath 10 is inserted into the vessel closure device delivery sheath 40 until the rotating collar 16 reaches and engages the end cap 46 of the vessel closure device delivery sheath. The collar 16 can be aligned with the end cap 46 so that the internal elements of the collar 16 can slide into the grooves of the end cap, and then rotate so that the two sheaths are now locked and fixed relative to one another. To un-couple the sheaths, the rotating collar 16 is rotated in the opposite direction to disengage the protrusions or threads on the end cap 46. Alternately, the protrusions are on the vessel closure device delivery sheath end cap 46 and the grooves or threads are on the rotating collar. In another example, the end of the procedure sheath hub 15 has a feature which can snap into the end cap 46 of the vessel closure device delivery sheath 40 when the procedure sheath 10 is inserted into the vessel closure device delivery sheath 40. In this example, the two sheaths are pushed together to mechanically engage one another and pulled apart to disengage from one another.

In another implementation, the vessel closure device delivery sheath 40 may be positioned anywhere that is suitable for the procedure 10 such that the distal tip of the procedure sheath 10 extends beyond the distal tip of the vessel closure device delivery sheath 40, up to the point where the closure sheath hub 45 abuts the procedure sheath hub 15 and can be manipulated and/or used as an unit or system.

The sheath dilator 20 has an internal lumen sized to co-axially receive an introducer guidewire 30. In an implementation, the guide wire 30 is an 0.038" (0.965 mm) outer diameter guidewire, and the dilator 20 internal lumen diameter and taper shaped are optimized to provide a smooth transition from the dilator 20 to the guide wire 30. In another implementation, the guide wire 30 is an 0.035" (0.889 mm) diameter guidewire, with sheath dilator 20 inner lumen diameter and taper configured accordingly. In another implementation the guide wire 30 is an 0.018" (0.457 mm), an 0.016" (0.406 mm), or an 0.014" (0.356 mm) OD guide wire, with sheath dilator 20 inner lumen diameter and taper configured accordingly. The inner diameter of the dilator 20 may be large enough to receive the guide wire 30, but small enough to reduce the concentric gap between the guide wire 30 and the lumen of the dilator 20. The guide wire 30 has an atraumatic tip 35 on the distal end. In an implementation, the guide wire tip 35 has a J-shape. In another implementation, the guide wire tip 35 is an angled tip. In another implementation the guide wire has a floppy tip. In an implementation, the guide wire core is constructed from spring stainless steel. In another implementation, the guide wire core is constructed from nitinol. In another implementation, the guide wire core is a combination of stainless steel and nitinol.

A vessel closure device applier configured to deliver a vessel closure device, such as the type of closure clip described in U.S. Publication No. 2010/0228269, filed Feb. 26, 2010, entitled Vessel Closure Clip Device, which is incorporated herein in its entirety, can be used with the system 1. Any of a variety of vessel closure devices and device appliers can be used including clip closure devices, suture closure devices, plug-type closure devices and their associated delivery systems. In clip closure devices, the clip is adapted to transition between a cylindrical configuration and a flat or planar configuration. The annular body may include a plurality of looped or curved elements and tines that are connected to one another to form the body. The clip is substantially cylindrical in the first configuration and, once deployed, transitions to a flat configuration in the vessel wall. A plug-type closure deposits a plug of material such as a collagen plug or polymer material against the outside of the vessel access site that typically expands in situ to create hemostasis at the site. Some devices additionally provide temporary, semi-permanent or permanent anchoring to ensure sufficient compression of the plug against the access site to maintain hemostasis. The closure detection devices described herein can be used with any of a variety of closure devices and their appliers.

Vessel closure device appliers typically include a handle sized and shaped to be grasped by a user and an elongated delivery shaft that extends outward from a distal end of the handle. At the end of a procedure, the procedural sheath 10 can be uncoupled and removed from the vessel closure device delivery sheath 40 and the shaft of the applier inserted into the inner lumen of the vessel closure device delivery sheath 40 so as to deliver the closure device to the wall of the vessel.

Figure 5A:
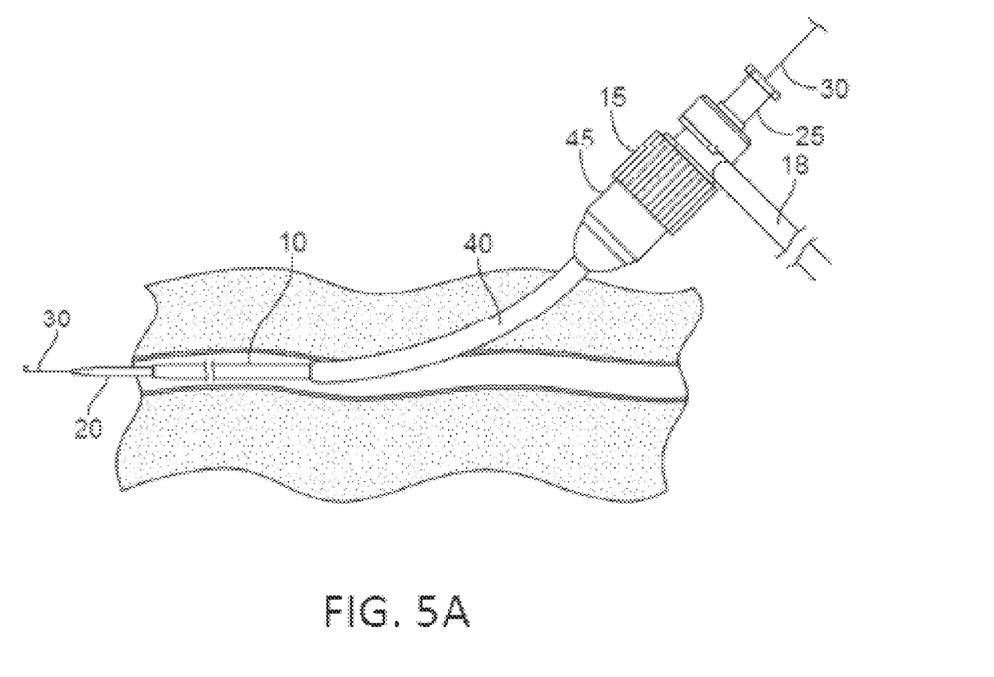
FIGS. 5A-5D illustrate an implementation of a method of using a vessel access and closure assist system.
Figure 5B:
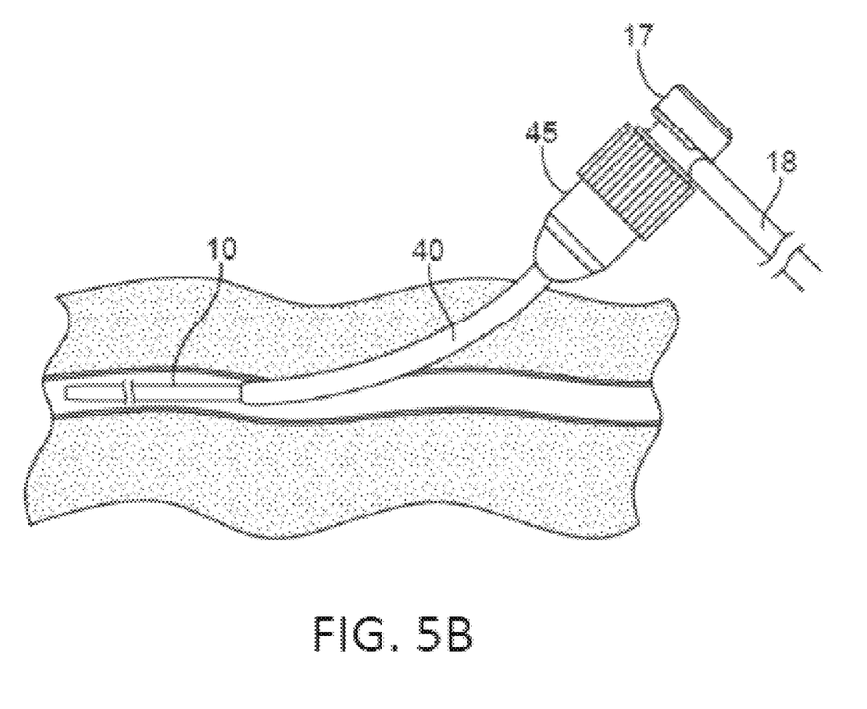

An exemplary method of using a vessel access and closure assist system is shown in FIGS. 5A-5D. Note the angle of approach to the vessel is less than perpendicular. An introducer guidewire 30 is inserted into the blood vessel via the access site using standard techniques, for example a modified Seldinger or micropuncture technique. The sheath dilator 20 is inserted into the procedural sheath 10. The dilator hub 25 can snap into or otherwise engage the procedural sheath hub 15. The procedural sheath 10 can be coupled to the vessel closure device delivery sheath 40 by inserting the procedural sheath 10 into the vessel closure device delivery sheath 40 such that the two are co-axially aligned. The rotating collar 15 on the procedural sheath can engage the end cap 46 on the vessel closure device delivery sheath hub 45 and rotated to lock the two sheaths together such that they are immobilized relative to one another. When coupled, the two sheaths form a coupled sheath assembly wherein a distal end of the procedural sheath 10 extends out of and/or distally past a distal end of the vessel closure device delivery sheath 40, as shown in FIG. 4B. The coupled sheaths and dilator can be inserted into the blood vessel as a single assembly over the guide wire 30 through the access site into to the blood vessel (see FIG. 5A). Once in the blood vessel, the guide wire 30 and sheath dilator 20 are removed, the two coupled sheaths can be left as shown in FIG. 5B. In this manner, the coupled sheaths (procedure sheath 10 and vessel closure device delivery sheath 40) provide a passageway into the blood vessel whereby hemostasis is maintained by hemostasis valves 47 and 17. As mentioned, the access site may be a transcarotid access site such as in the region of the carotid arteries.

Figure 5C:
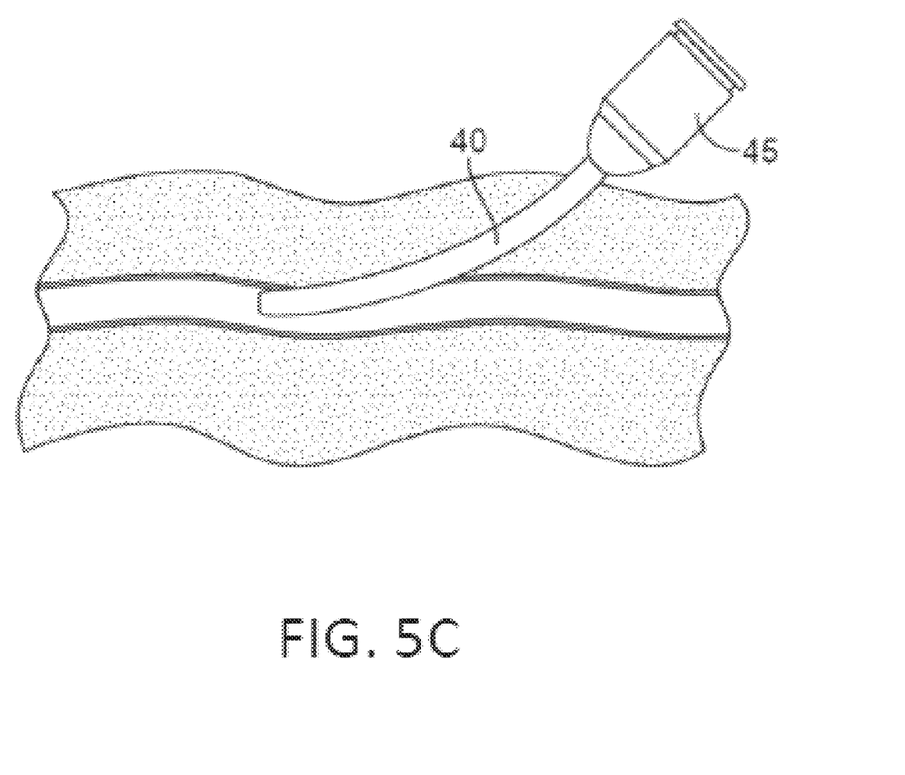
Figure 5D:
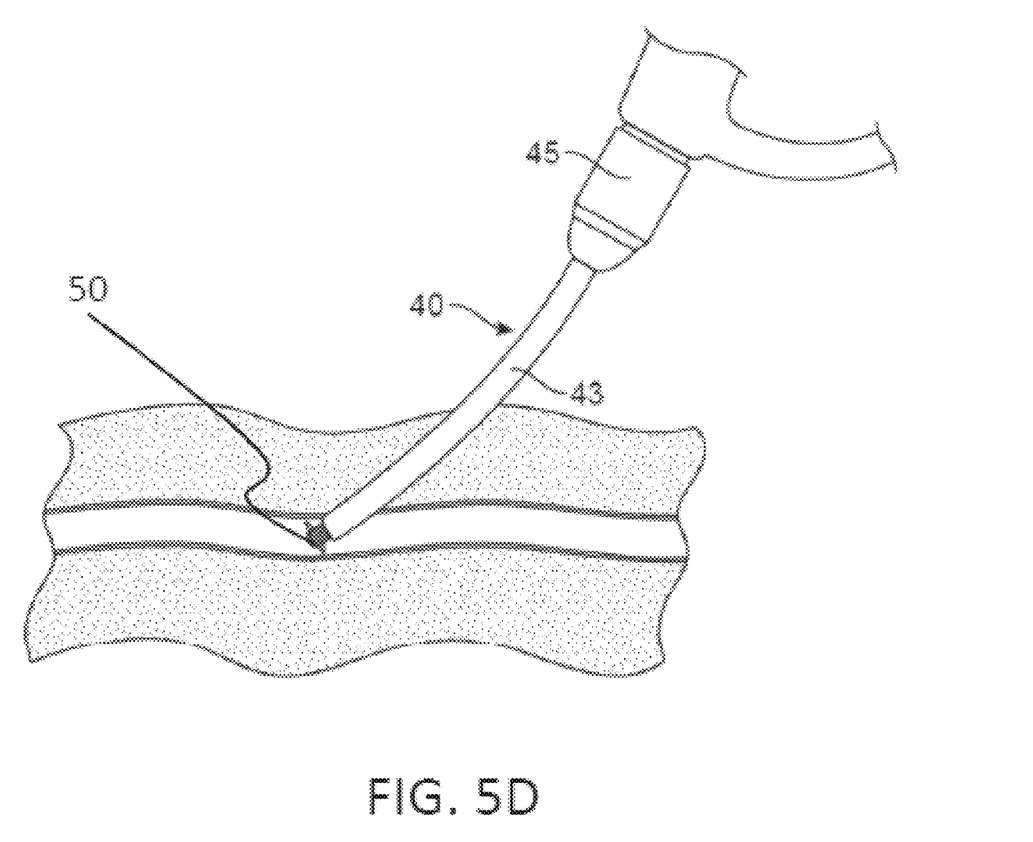

At the conclusion of the intervention, the procedural sheath 10 and vessel closure device delivery sheath 40 can be uncoupled and the sheath 10 pulled out of the vessel closure device delivery sheath 40. The vessel closure device delivery sheath 40 can remain in the artery as shown in FIG. 5C. Advantageously, the vessel closure device delivery sheath 40 is already positioned in the artery due to the vessel closure device delivery sheath 40 and the procedural sheath 10 being pre-coupled to one another and positioned in the artery as a single assembly. This eliminates the step of having to perform an exchange procedure where the procedural sheath 10 is removed from the artery and then the vessel closure device delivery sheath 40 is inserted into the artery. With the vessel closure device delivery sheath 40 positioned in the artery, the applier can be inserted into the vessel closure device delivery sheath 40 (FIG. 5D). The vessel closure device delivery sheath 40 provides a passageway for delivery of the vessel closure device such as a closure clip.

As described above, following deployment of the closure device 50, a pressure relief device 100 can be inserted through the delivery sheath 40. The delivery sheath 40 can be at least partially withdrawn so that the distal end of the sheath 40 remains adjacent the deployed closure device 50. The tube 105 of the pressure relief device 100 can be inserted through the proximal hub 45 until the distal-most end 107 exits the distal end of the sheath 40 near the target location. The sheath 40 can be withdrawn over the device 100 leaving the device 100 in place. The proximal end of the device 100, positioned external to the hub 45 or within a region of the sheath 40, can be prevented from withdrawing with the sheath 40 as the sheath 40 is removed from the tissue track such as with a pusher or other tool. Alternatively, the delivery sheath 40 can be withdrawn first and the pressure relief device 100 inserted using a dedicated insertion tool 60 navigated through the tissue track left behind by the delivery sheath 40 upon withdrawal.

In aspects, description is made with reference to the figures. However, certain aspects may be practiced without one or more of these specific details, or in combination with other known methods and configurations. In the description, numerous specific details are set forth, such as specific configurations, dimensions, and processes, in order to provide a thorough understanding of the implementations. In other instances, well-known processes and manufacturing techniques have not been described in particular detain in order to not unnecessarily obscure the description. Reference throughout this specification to "one embodiment," "an embodiment," "an aspect," "one aspect," "one implementation," "an implementation," or the like, means that a particular feature, structure, configuration, or characteristic described is included in at least one embodiment, aspect, or implementation. Thus, the appearance of the phrase "one embodiment," "an embodiment," "one aspect," "an aspect," "one implementation, "an implementation," or the like, in various placed throughout this specification are not necessarily referring to the same embodiment, aspect, or implementation. Furthermore, the particular features, structures, configurations, or characteristics may be combined in any suitable manner in one or more implementations.

The use of relative terms throughout the description may denote a relative position or direction or orientation and is not intended to be limiting. For example, "distal" may indicate a first direction away from a reference point. Similarly, "proximal" may indicate a location in a second direction opposite to the first direction. Use of the terms "front," "side," and "back" as well as "anterior," "posterior," "caudal," "cephalad" and the like or used to establish relative frames of reference, and are not intended to limit the use or orientation of any of the devices described herein in the various implementations.

The word "about" means a range of values including the specified value, which a person of ordinary skill in the art would consider reasonably similar to the specified value. In embodiments, about means within a standard deviation using measurements generally acceptable in the art. In embodiments, about means a range extending to +/−10% of the specified value. In embodiments, about includes the specified value.

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples, embodiments, aspects, and implementations are disclosed. Variations, modifications and enhancements to the described examples and implementations and other implementations may be made based on what is disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

The invention claimed is:

1. A pressure relief device for use in a percutaneous procedure, the device comprising a tube having a distal opening into an internal lumen and a proximal opening from the internal lumen, a length of the tube sized to position the distal opening near a closed arteriotomy in a vessel and the proximal opening remains external to a patient's skin;
   a visual indicator coupled to a proximal end region of the tube; and
   wherein the visual indicator is a thin disc of material configured to change color upon contact with blood from the internal lumen.

2. The device of claim 1, wherein the visual indicator is fixedly coupled to the proximal end region of the tube or removably coupled to the proximal end region of the tube.

3. The device of claim 1, wherein the material is selected from the group consisting of high-density polyethylene, polyamide, polyethersulfone, and polyvinylidene fluoride.

4. The device of claim 1, wherein the visual indicator has a larger outer diameter than an outer diameter of the proximal end region of the tube.

5. The device of claim 1, wherein the tube is formed of a polymer, metal, or a combination of polymer and metal.

6. The device of claim 1, wherein at least a portion of the tube is coated on an external surface with a lubricious polymer coating.

7. The device of claim 6, wherein the polymer coating is silicone or polytetrafluoroethylene.

8. The device of claim 1, wherein the tube has a length that is between 3 cm and 10 cm.

9. The device of claim 1, wherein the tube is circular or oval in cross-section.

10. The device of claim 1, wherein the distal opening is the only opening of a distal end region of the tube.

11. The device of claim 1, wherein the tube comprises one or more side wall openings through a distal end region of the tube.

12. The device of claim 1, wherein the proximal opening is the only opening of a proximal end region of the tube.

13. The device of claim 1, wherein the tube comprises one or more side wall openings through a proximal end region of the tube.

14. The device of claim 1, wherein the tube has an inner diameter of about 0.004" and 0.020".

15. The device of claim 1, wherein the vessel is a carotid artery including a common carotid artery, an internal carotid artery, and an external carotid artery.

16. The device of claim 1, wherein, in use, the proximal opening is positioned external to the patient's skin forming a pressure gradient with the region near the closed arteriotomy.

17. A kit comprising the device of claim 1, and further comprising one or more visual indicators configured to mate with a proximal end region of the tube.

18. The kit of claim 17, wherein a length of the tube is customizable by trimming.

19. The kit of claim 17, further comprising an inserter having an outer diameter sized to receive the lumen of the tube and a length sufficient to insert through the lumen so that a distal end region projects beyond the distal opening of the tube.

20. The kit of claim 17, further comprising one or more of a procedural introducer sheath, a sheath dilator, an introducer guide wire, a closure device delivery sheath, a vessel closure device applier, and a closure device.

21. A pressure relief device for use in a percutaneous procedure, the device comprising a tube having a distal opening into an internal lumen and a proximal opening from the internal lumen, a length of the tube sized to position the distal opening near a closed arteriotomy in a vessel and the proximal opening remains external to a patient's skin;
wherein the lumen of the tube comprises a viscous material configured to impede the ingress of foreign material or air into the tissue track.

22. The device of claim 21, wherein the viscous material is petrolatum, polyethylene glycol, or glycerin containing one or more antibiotics.

23. The device of claim 21, wherein the viscous material fills the lumen from the proximal opening to the distal opening.

24. The device of claim 21, wherein the viscous material is a discrete plug of material contained within the lumen.

25. The device of claim 21, wherein blood is able to pass through the viscous material to provide pressure relief.

26. A method of using a pressure relief device following a percutaneous procedure, the method comprising:
closing an arteriotomy in a vessel percutaneously;
inserting a pressure relief device through a tissue track leading toward the arteriotomy, the pressure relief device comprising a tube having a distal opening into an internal lumen and a proximal opening from the internal lumen and a visual indicator coupled to a proximal end region of the tube that is configured to change color upon contact with blood from the internal lumen;
wherein the visual indicator is a thin disc of material configured to change color upon contact with blood from the internal lumen; and
positioning the distal opening near the arteriotomy and the proximal opening external to a patient's skin.

27. The method of claim 26, wherein the visual indicator is fixedly coupled or removably coupled.

28. The method of claim 26, wherein the vessel is a carotid artery including a common carotid artery, an internal carotid artery, and an external carotid artery.

\* \* \* \* \*